(12) United States Patent
Choi et al.

(10) Patent No.: US 11,343,647 B2
(45) Date of Patent: May 24, 2022

(54) ELECTRONIC DEVICE FOR DETERMINING LOCATION AND OPERATION METHOD THEREOF

(71) Applicant: Samsung Electronics Co., Ltd., Suwon-si (KR)

(72) Inventors: Ilhwan Choi, Suwon-si (KR); Inho Baek, Suwon-si (KR); Deokkyoung Yoon, Suwon-si (KR); Kyungtae Lee, Suwon-si (KR); Taejoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/059,166

(22) PCT Filed: May 21, 2019

(86) PCT No.: PCT/KR2019/006066
§ 371 (c)(1),
(2) Date: Nov. 25, 2020

(87) PCT Pub. No.: WO2019/225947
PCT Pub. Date: Nov. 28, 2019

(65) Prior Publication Data
US 2021/0219098 A1    Jul. 15, 2021

(30) Foreign Application Priority Data
May 25, 2018    (KR) .................. 10-2018-0059574

(51) Int. Cl.
*H04W 4/029*    (2018.01)
*H04W 8/20*    (2009.01)
(Continued)

(52) U.S. Cl.
CPC ........... *H04W 4/029* (2018.02); *H04W 4/023* (2013.01); *H04W 8/20* (2013.01); *H04W 64/00* (2013.01)

(58) Field of Classification Search
CPC ....... H04W 4/023; H04W 4/029; H04W 8/20; H04W 64/00
(Continued)

(56) References Cited

U.S. PATENT DOCUMENTS

| 8,938,257 B2 | 1/2015 | Chao et al. |
| 8,949,013 B2 | 2/2015 | Yang et al. |

(Continued)

FOREIGN PATENT DOCUMENTS

| KR | 10-2010-0050958 A | 5/2010 |
| KR | 10-2011-0126893 A | 11/2011 |

(Continued)

OTHER PUBLICATIONS

International Search Report dated Aug. 29, 2019 in connection with International Patent Application No. PCT/KR2019/006066, 2 pages.
(Continued)

*Primary Examiner* — Ted M Wang

(57) ABSTRACT

Various embodiments of the disclosure relate to an electronic device for determining a location, and an operating method thereof. The electronic device may include a communication circuit, a memory, and at least one processor. The memory may store instructions, when executed, causing the processor to determine a visiting area of the electronic device based on at least one signal received through the communication circuit, acquire information on a plurality of places corresponding to the visiting area, acquire place-related information based on at least one of usage information of the electronic device and information stored in the memory, and determine one place among the plurality of (Continued)

places as a visiting place of the electronic device based on the information on the plurality of places and the place-related information. Other embodiments may also be possible.

15 Claims, 14 Drawing Sheets

(51) Int. Cl.
  *H04W 4/02* (2018.01)
  *H04W 64/00* (2009.01)
(58) Field of Classification Search
  USPC .................................................. 455/456.3
  See application file for complete search history.

(56) References Cited

U.S. PATENT DOCUMENTS

| | | | |
|---|---|---|---|
| 9,872,150 | B2 | 1/2018 | Priness et al. |
| 2011/0087431 | A1 | 4/2011 | Gupta et al. |
| 2013/0226857 | A1* | 8/2013 | Shim ..................... H04W 4/029 706/52 |
| 2015/0024780 | A1 | 1/2015 | Hong et al. |
| 2016/0165388 | A1* | 6/2016 | Turner ................... H04L 67/26 455/456.1 |

FOREIGN PATENT DOCUMENTS

| | | |
|---|---|---|
| KR | 10-2012-0088746 A | 8/2012 |
| KR | 10-2014-0000566 A | 1/2014 |
| KR | 10-2014-0133069 A | 11/2014 |
| KR | 10-2015-0009833 A | 1/2015 |

OTHER PUBLICATIONS

Written Opinion of the International Searching Authority dated Aug. 29, 2019 in connection with International Patent Application No. PCT/KR2019/006066, 5 pages.

* cited by examiner

ELECTRONIC DEVICE FOR DETERMINING LOCATION AND OPERATION METHOD THEREOF

CROSS-REFERENCE TO RELATED APPLICATIONS

This application is a 371 of International Application No. PCT/KR2019/006066 filed on May 21, 2019, which claims priority to Korean Patent Application No. 10-2018-0059574 filed on May 25, 2018, the disclosures of which are herein incorporated by reference in their entirety.

BACKGROUND

1. Field

Various embodiments of the disclosure relate to a method and apparatus for determining a location of an electronic device.

2. Description of Related Art

With the advancement of information communication technologies and semiconductor technologies, various types of electronic devices are used such as a mobile communication terminal, a Personal Digital Assistant (PDA), an electronic organizer, a smartphone, a tablet Personal Computer (PC), a wearable device, or the like.

The electronic device may provide various services based on location information of the electronic device. For example, the electronic device may acquire the location information of the electronic device based on a signal received from a Global Positioning System (GPS) or a cell tower, and may provide a service based on the acquired location information.

The location information acquired in the electronic device may not be the same as an actual location of the electronic device. For example, the location information acquired based on the GPS or the cell tower has a margin of error of several hundred meters, and location information acquired using WiFi has a margin of error of several tens of meters. Due to the margin of error of such location information, the electronic device cannot determine an exact place where the electronic device is located in an area where various places are densely located.

Accordingly, various embodiments of the disclosure disclose an apparatus and method for determining a visiting place of an electronic device by using location information based on a communication signal in an electronic device and a variety of information of the electronic device.

SUMMARY

According to various embodiments, an electronic device may include a communication circuit, a memory, and at least one processor. The memory may store instructions, when executed, causing the processor to determine a visiting area of the electronic device based on at least one signal received through the communication circuit, acquire information on a plurality of places corresponding to the visiting area, acquire place-related information based on at least one of usage information of the electronic device and information stored in the memory, and determine one place among the plurality of places as a visiting place of the electronic device based on the information on the plurality of places and the place-related information.

According to various embodiments, a method of operating an electronic device may include determining a visiting area of the electronic device based on at least one signal received through the communication circuit, acquiring information on a plurality of places corresponding to the visiting area, acquiring place-related information based on at least one of usage information of the electronic device and information stored in the memory, and determining one place among the plurality of places as a visiting place of the electronic device based on the information on the plurality of places and the place-related information.

An electronic device and an operating method thereof according to various embodiments of the disclosure can determine a visiting place of the electronic device by using location information based on a communication signal in the electronic device and a variety of information of the electronic device, thereby accurately inferring and/or determining a user's visiting place within an area where various places are densely located. In addition, the electronic device can provide various services suitable for a user's situation, inclination, and/or preference, based on an accurate visiting place.

DETAILED DESCRIPTION

Figure 1:
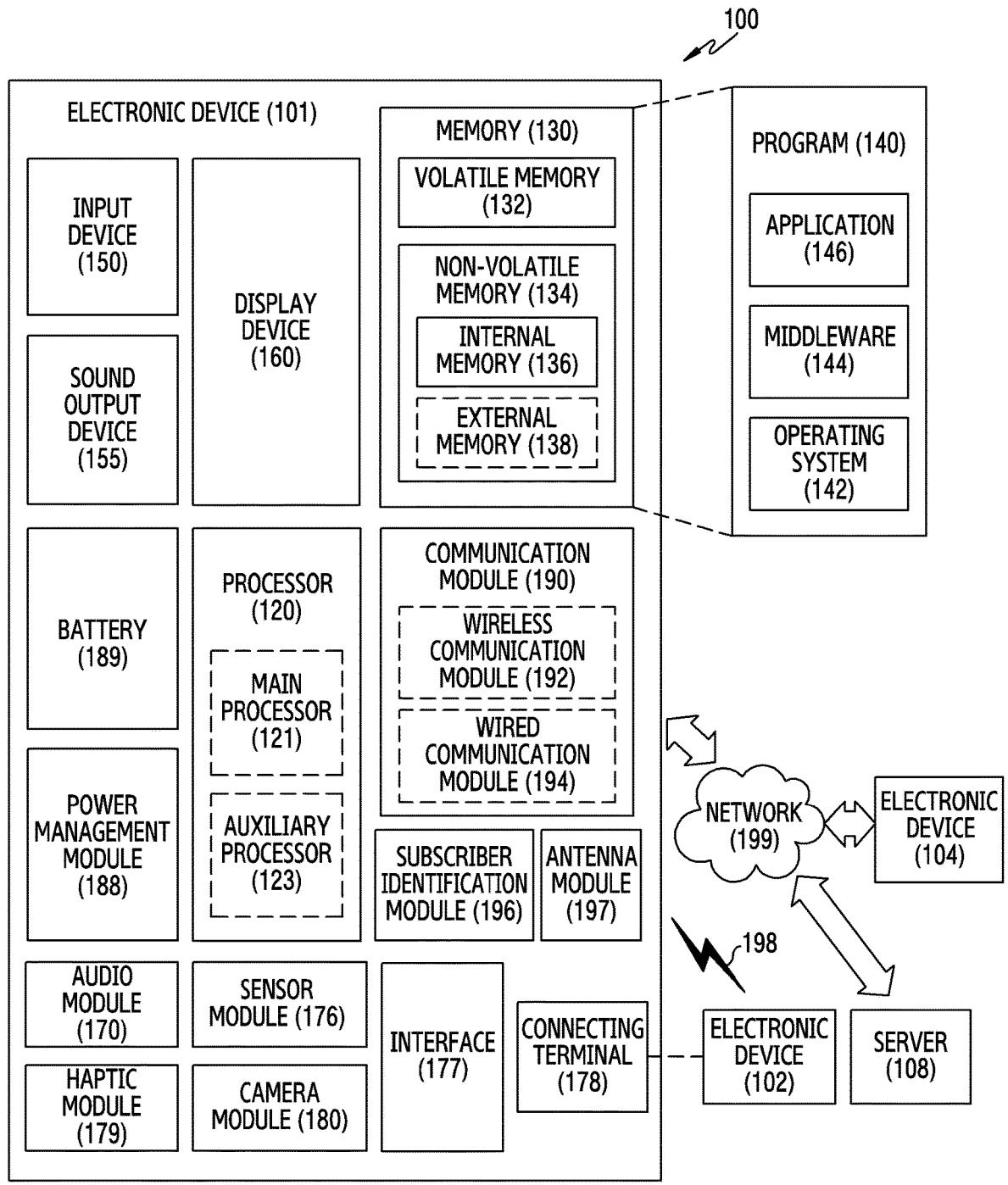
FIG. 1 is a block diagram of an electronic device in a network environment 100 according to various embodiments of the disclosure.

Hereinafter, various embodiments of the disclosure are described with reference to the accompanying drawings. It should be appreciated that the embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression may include a plural expression unless there is a contextually distinctive difference.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the processor 120 may determine a place where the electronic device 101 visits based on at least one communication signal acquired through the communication module 190 and a variety of information that can be acquired from the electronic device 101. The place may be, for example, an area designated to have specific address information and/or a specific name, based on a purpose, business, or usage. For example, the place may include at least one of a store, a park, a school, a hospital, a bank, a library, a road, or a company. The at least one communication signal may include, for example, at least one of a GPS reception signal (or a GNSS reception signal), a signal received from a cell tower (or a base station), a signal received from an Access Point (AP) of a short-range wireless communication network (e.g., WiFi), a beacon signal, a signal transmitted and/or received with respect to Internet of Things (IoT) devices, and a signal transmitted and/or received with respect to another electronic device.

According to various embodiments, upon detecting an event for determining a visiting place of the electronic device 101, the processor 120 may determine a visiting area of the electronic device 101 based on at least one communication signal. The event for determining the visiting place may be periodically detected or may be detected when a designated condition is satisfied (e.g., when a movement and/or motion of the electronic device 101 is not detected for a designated time duration). The visiting area may be, for example, a geographic area corresponding to at least one place. According to an embodiment, upon detecting the event for determining the visiting place of the electronic device 101, the processor 120 may transmit/receive at least one communication signal through the communication module 190, and may acquire location information of the electronic device 101 based on the at least one communication signal transmitted/received. For example, the processor 120 may acquire at least one piece of location information on the electronic device, by using at least one of a signal received through a GPS receiver (or a GNSS communication module), a signal received from at least one AP, a beacon signal received from at least one different electronic device, a signal received from at least one IoT device, and a signal received from at least one sensor device. The processor 120 may acquire location information by using at least one of location information included in at least one communication signal (e.g., location information of a device which has transmitted a communication signal), time information included in the at least one communication signal, reception strength of the at least one communication signal, and sensor data included in the at least one communication signal. For instance, the processor 120 may acquire the location information on the electronic device 101 based on a signal received through the GPS receiver, and may acquire the location information on the electronic device 101 based on a signal received from a WiFi AP. The location information may include, for example, at least one of latitude, longitude, and altitude information. The location information acquired based on different types of communication signals may be the same or different from each other. According to an embodiment, the processor 120 may determine the visiting area of the electronic device 101 based on a margin of error of the acquired location information. For example, the processor 120 may determine the margin of error of the location information based on a type of at least one communication signal used to acquire the location information, and may determine the visiting area based on the determined location information and margin of error. For instance, if the location information is acquired based on the signal received through the GPS receiver, the processor 120 may determine a designated margin of error (e.g., a first radius) corresponding to a GPS type as the margin of error of the location information. The processor 120 may determine an area corresponding to the margin of error as the visiting area based on the acquired location information. As another example, if first location information is acquired based on the signal received through the GPS receiver and second location information is acquired based on the signal received from the WiFi AP, the processor 120 may determine a designated margin of error (e.g., the first radius) corresponding to the GPS type as a first margin of error for the first location information, and determine a designated margin of error (e.g., a second radius) corresponding to the WiFi AP as a second margin of error for the second location information. The processor 120 may determine a first area corresponding to the first margin of error based on the first location information and a second area corresponding to the second margin of error based on the second location information, and may determine an area commonly included in the first area and the second area as the visiting area of the electronic device 101.

According to various embodiments, the processor 120 may acquire information on at least one place corresponding to the visiting area. According to an embodiment, the processor 120 may acquire the information on at least one place corresponding to the visiting area, based on a place designated (or registered) in the electronic device 101 as a favorite place or a place scheduled to visit. For example, the processor 120 may determine whether the designated place corresponds to the visiting area based on location information of the place designated as the favorite place or the place scheduled to visit. If the designated place corresponds to the visiting area, the processor 120 may determine information of the designated place as information on a place corresponding to the visiting area. According to an embodiment, the processor 120 may determine the designated place, which is determined as a place corresponding to the visiting area, as the visiting place. If the designated place does not correspond to the visiting area, the processor 120 may acquire the information on the place corresponding to the visiting area in another manner (e.g., through communication with the server 108 and/or place-related database). The place-related database may include a Point Of Interest (POI) database. According to an embodiment, the processor 120 may acquire information on at least one place corresponding to the visiting area, based on communication with the server 108 and/or a pre-acquired place-related database. For example, the processor 120 may transmit to the server 108 a signal for requesting place information on the visiting area, and may receive from the server 108 a response signal including information on at least one place corresponding to the visiting area. The signal for requesting the place information on the visiting area may include information indicating the visiting area. The information on at least one place may include at least one of a name of a place (or a place name), location information of the place (e.g., a location coordinate indicating latitude and longitude), an address of the place, a category of the place, and an operating hour of the place. For instance, if there are a pizza store and a hospital in the visiting area, the information on at least one place may include "first place—name: OOOO pizza, location information: (latitude1, longitude1), address: 129-1, Samseong-ro, Yeongtong-gu, Suwon-si, Gyeonggi-do, category: food/pizza specialty store, operating hour: 10:00-21:00" and "second place—name: OO hospital, location information: (latitude2, longitude2), address: 129-2, Samseong-ro, Yeongtong-gu, Suwon-si, Gyeonggi-do, category: hospital, operating hour: 09:00-18:00". As another example, the processor 120 may acquire the information on at least one place corresponding to the visiting area from a place-related database pre-acquired through wired or wireless communication. The place-related database may include information on places corresponding to respective various areas. According to an embodiment, when there is only one place corresponding to the visiting area, the processor 120 may determine one place corresponding to the visiting area as the visiting place of the electronic device 101. According to an embodiment, when there are a plurality of places corresponding to the visiting area, the processor 120 may generate a candidate place list including information on the plurality of places corresponding to the visiting area. According to an embodiment, the processor 120 may select at least one place from among the plurality of places corresponding to the visiting area, based on a visit time corresponding to the visiting area, and may generate a candidate place list including only information of the selected place. For example, the processor 120 may select at least one place determined to be in an operating state at the visit time, based on the operating hour and visit time of the plurality of places corresponding to the visiting area, and may generate a candidate place list including information on the selected at least one place. As another example, the processor 120 may generate a candidate place list including information on the remaining places other than a place determined to be not in the operating state at the visit time, based on the operating hour and visit time of the plurality of places corresponding to the visiting area. According to an embodiment, the processor 120 may determine a priority for each of the plurality of places corresponding to the visiting area. For example, the processor 120 may determine the priority for each of the plurality of places, based on received signal strength in the visiting area. For instance, the processor 120 may assign a highest priority to a location where signal strength is measured to be the highest, and may assign a lowest priority to a location where the signal strength is measured to be the lowest.

According to various embodiments, the processor 120 may acquire place-related information, based on usage information and storage information of the electronic device. The usage information of the electronic device may include information related to an operation of the electronic device, which occurs during a specific time duration including a visit time. The specific time duration including the visit time may include, for example, from a timing earlier by a designated time duration than a visit time corresponding to a visiting area to timings at which the electronic device 101 stays in the visiting area. For instance, the specific time duration including the visit time may include a time duration from a timing earlier by a designated time duration than the visit time corresponding to the visiting area to a timing of detecting that the electronic device 10 deviates from the visiting area. According to an embodiment, the usage information of the electronic device may include at least one of information related to an application program, information related to a website, information related to a captured and/or received image, and information related to a user input. The information related to the application program may include, for example, at least one of a name, category, usage time, and usage frequency of the application program used during a specific time duration including a visit time. The information related to the website may include, for example, at least one of a name, category, address information, access time information, and access frequency of a website accessed during a specific time duration including a visit time, and search information through the website. The information related to the captured and/or received image may include, for example, at least one of capture time information of an image captured through the camera module 180 during a specific time duration including a visit time or received from another electronic device (e.g., the electronic device 102 or the electronic device 104), information of a subject in the image, and text information in the image. The information related to the user input may include, for example, text information or voice information which is input during the specific time duration including the visit time. According to an embodiment, the storage information of the electronic device may include user profile information or schedule information pre-stored in the memory 130 of the electronic device 101. The schedule information may include, for example, time information and/or place information related to a user schedule. For instance, the schedule information may include time information and/or place information related to a user schedule such as "2018.04.12, dinner with son", "2018.04.12, OO pizza with son", "2018.04.12, 13:00, dental appointment", "2018.04.12, 13:00, OO dentist", or the like. According to an embodiment, the schedule information may be acquired from at least one application program among an e-mail application program, a calendar application program, a message application program, a memo application program, and a note application program. The user profile information may include, for example, at least one of a user characteristic and preference information. For example, the user profile information may include anthropological category information such as age, gender, family information, and address, and may include information such as favorite sports, favorite food, favorite music, favorite movies, frequently visiting places, and the like.

According to an embodiment, the processor 120 may collect the usage information and storage information of the electronic device, and may determine whether the collected information is information related to a place. For example, the processor 120 may determine whether the information is related to the place, based on whether the collected information has a word related to the place, a subject related to the place, a text related to the place, or voice information related to the place. According to an embodiment, the processor 120 may acquire the place-related information, based on information determined to be related to the place in the collected usage information and storage information of the electronic device. The place-related information may include at least one of a place name and a place category. According to an embodiment, the processor 120 may generate place-related information from the information determined to be related to the place in the collected usage information and storage information of the electronic device. For instance, if the collected information is "name of application program: OO cafe, category: coffee shop application, usage time: 2018.04.12, 13:05-13:10", since the place-related words "OO cafe" and "OO coffee shop" are included, the processor 120 may determine corresponding information as information related to the place, and may acquire "place name: OO cafe, place category: coffee shop" as the place-related information. As another example, if the collected information is "website name: OO restaurant, category: restaurant/Italian restaurant, access time: 2018.04.12, 12:40-13:00, search information through the website: pasta", since the place-related words "OO restaurant", "restaurant/Italian restaurant", and "pasta" are included, the processor 120 may determine corresponding information as information related to the place, and may acquire "place name: OOO pizza, place category: pizza" as the place-related information. As another example, if the collected information is "image capture time: 2018.04.12, 13:30, subject in image: pizza, text information in image: OOO pizza", since the place-related words "pizza" and "OOO pizza" are included, the processor 120 may determine corresponding information as information related to the place, and may acquire "place name: OOO pizza, place category: pizza" as the place-related information. As another example, if the collected information is "voice information: find a delicious coffee shop nearby", since the place-related word "coffee shop" is included, the processor 120 may determine corresponding information as information related to a place, and may acquire "place category: coffee shop" as the place-related information. As another example, if the collected information is "age: 20s, favorite sports: bowling", since the place-related word "bowling" is included, the processor 120 may determine corresponding information as the place-related information, and may acquire "place category: bowling" as the place-related information. According to an embodiment, if the collected information is user profile information, the processor 120 may acquire place-related information corresponding to a user profile from the server 108. For example, the processor 120 may transmit the user profile information to the server 108 through the communication module 190, and may receive the place-related information corresponding to the user profile from the server 108.

According to various embodiments, the processor 120 may determine the visiting place of the electronic device 101, based on the place-related information and information on the plurality of places corresponding to the visiting area. According to an embodiment, the processor 120 may determine the visiting place of the electronic device 101, based on whether the place-related information matches at least one of a plurality of places corresponding to the visiting area. According to an embodiment, when the place-related information matches at least one of the plurality of places corresponding to the visiting area, the processor 120 may determine a priority of the plurality of places corresponding to the visiting area, based on the matching result. For example, the processor 120 may determine the priority of the place matching the place-related information among the plurality of places corresponding to the visiting area to be higher than a priority of a place not matching the place-related information. As another example, the processor 120 may determine that a higher priority is set to places having a greater number of pieces of matching place-related information among the plurality of places corresponding to the visiting area. For instance, the processor 120 may determine a priority of a place matching a place name of the place-related information among the plurality of places corresponding to the visiting area to be higher than a priority of a place matching a place category of the place-related information. The processor 120 may determine the visiting place of the electronic device 101, based on the priority of the plurality of places corresponding to the visiting area. For example, the processor 120 may determine a place having a highest priority among the plurality of places as the visiting place of the electronic device 101. The aforementioned priority determining method is for exemplary purposes, and the disclosure is not limited thereto. For example, the processor 120 may determine the priority of the plurality of places in various manners. According to an embodiment, if the place-related information does not match at least one of the plurality of places corresponding to the visiting area, the processor 120 may determine the visiting place of the electronic device 101, based on a history for a previous visiting place of the electronic device 101. For example, if there is no place matching the place-related information among the plurality of places corresponding to the visiting area, the processor 120 may determine the visiting place of the electronic device 101, based on the history for the previous visiting place.

According to various embodiments, the processor 120 may determine whether a designated event related to the visiting place occurs. For example, if a user input for requesting an indication of the visiting place is detected, or if it is identified that the number of times of visiting the same place is greater than or equal to a designated count, or if the visiting place is a pre-designated place, the processor 120 may determine that the designated event related to the visiting place occurs. This is for exemplary purposes, and the disclosure is not limited thereto. According to an embodiment, upon detecting the designated event related to the visiting place, the processor 120 may control the display device 160 such that the visiting place of the electronic device 101 is displayed. According to an embodiment, the processor 120 may additionally display detailed information of the visiting place. The detailed information of the visiting place may be acquired from a place-related database and/or the server 108. According to an embodiment, the processor 120 may control the display device 160 to display information on at least one visiting place visited during a specific time duration. According to an embodiment, the processor 120 may control the display device 160 such that information used to determine the visiting place is displayed together when information on the visiting place is displayed. For example, if the visiting place of the electronic device 101 is determined based on the place-related information acquired from first application program usage information, the processor 120 may control the display device 160 to display information of a first application program (e.g., a first application program name or a first application program icon) while displaying information on the visiting place. As another example, if the visiting place of the electronic device 101 is determined based on the place-related information acquired from website usage information, the processor 120 may control the display device 160 to display information of a corresponding website (e.g., a corresponding website name or website address) while displaying the information on the visiting place.

According to various embodiments, the memory 120 may store the place-related database under the control of the processor 120. The place-related database may be acquired from the server 108 and/or an external electronic device (e.g., the electronic device 102, the electronic device 104) through the communication module 190. According to various embodiments, the memory 120 may store information on the visiting place of the electronic device 101 under the control of the processor 120. According to an embodiment, the memory 120 may store information on a plurality of visiting places visited by the electronic device 101 during a specific time duration under the control of the processor 120.

According to various embodiments, the electronic device 101 may include a communication circuit (e.g., the communication module 190 of FIG. 1), a memory (e.g., the memory 130 o FIG. 1), and at least one processor (e.g., the processor 120 of FIG. 1). The memory may store instructions, when executed, causing the processor to determine a visiting area of the electronic device based on at least one signal received through the communication circuit, acquire information on a plurality of places corresponding to the visiting area, acquire place-related information based on at least one of usage information of the electronic device and information stored in the memory, and determine one place among the plurality of places as a visiting place of the electronic device based on the information on the plurality of places and the place-related information.

According to various embodiments, the instructions, when executed, may cause the processor 120 to acquire at least one piece of location information on the electronic device, based on at least one signal received through the communication circuit, determine at least one margin of error for the at least one piece of location information, based on a type of the at least one signal, and determine the visiting area of the electronic device, based on the at least one piece of location information and the at least one margin of error.

According to various embodiments, the instructions, when executed, may cause the processor 120 to acquire information of a place pre-registered in the electronic device, determine whether the pre-registered place corresponds to the visiting area, based on the information of the pre-registered place, and if the pre-registered place corresponds to the visiting area, determine the pre-registered place as the visiting place of the electronic device.

According to various embodiments, the instructions, when executed, may cause the processor to, if the pre-registered place does not correspond to the visiting area, transmit information of the visiting area to a server through the communication circuit, receive information of a place corresponding to the information of the visiting area from the server through the communication circuit, if one place corresponds to the information of the visiting area, determine the place as the visiting place of the electronic device, and if a plurality of places correspond to the information of the visiting area, determine one place among the plurality of places as the visiting place of the electronic device, based on information on the plurality of places and the place-related information.

According to various embodiments, information on the plurality of places may include at least one of a place name, location information, address information, category information, and an operating hour for each of the plurality of places.

According to various embodiments, the place-related information may include at least one of the place name and place category information.

According to various embodiments, usage information of the electronic device may include at least one of information related to an application program, information related to a website, information related to an image, and information related to a user input. The information related to the application program may include a name, category, execution time, and execution frequency of an executed application program. The information related to the website may include at least one of an accessed website name, category, address information, access time information, access frequency information, and search information through the accessed website. The information related to the image may include at least one of a capture time of the image, a subject in the image, and text information in the image. The information related to the user input may include at least one of text input information and voice input information.

According to various embodiments, the instructions, when executed, may cause the processor 120 to acquire usage information of the electronic device during a specific time duration including a time of visiting the visiting area, and acquire the place-related information from the acquired usage information.

According to various embodiments, information stored in the memory may include at least one of schedule information and user profile information.

According to various embodiments, the instructions, when executed, may cause the processor 129 to identify scheduling information corresponding to a time of visiting the visiting area in the schedule information stored in the memory, and acquire the place-related information including at least one of a place name and a place category from the identified schedule information.

According to various embodiments, the instructions, when executed, may cause the processor 120 to acquire user profile information stored in the memory, acquire a place-related word from the user profile information, and acquire the place-related information including at least one of a place name and a place category, based on the acquired place-related word.

According to various embodiments, the instructions, when executed, may cause the processor to acquire user profile information stored in the memory, transmit the user profile information to a server through the communication circuit, and receive the place-related information corresponding to the user profile information from the server through the communication circuit.

According to various embodiments, the instructions, when executed, may cause the processor to determine a priority of each of the plurality of places, based on information on the plurality of places and the place-related information, and determine one of the plurality of places as a visiting place of the electronic device, based on the priority of the plurality of places.

According to various embodiments, the electronic device may further include a display (e.g., the display device 160 of FIG. 1). The instructions, when executed, may cause the processor to, upon satisfying a designated condition for the visiting place, control the display to display information related to the visiting place.

Figure 2:
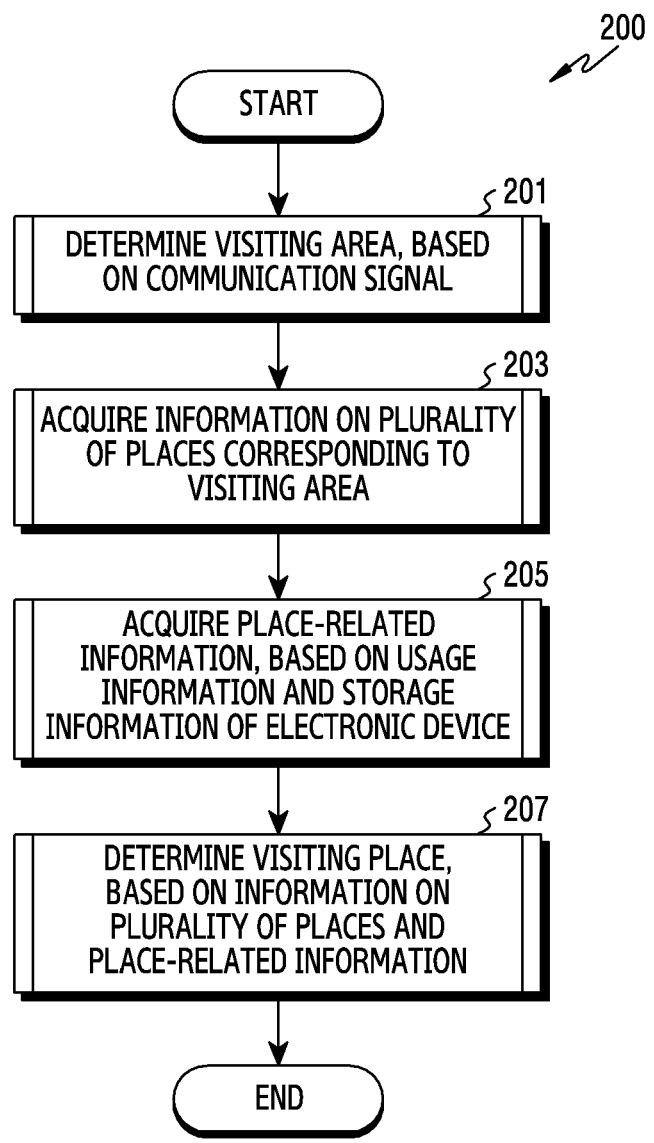
FIG. 2 is a flowchart for determining a visiting place in an electronic device according to various embodiments of the disclosure.

FIG. 2 is a flowchart 200 for determining a visiting place in an electronic device according to various embodiments of the disclosure. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 2, in operation 201, an electronic device (e.g., the processor 120 of FIG. 1) according to various embodiments may determine a visiting area of the electronic device, based on a communication signal. According to an embodiment, the processor 120 may transmit/receive at least one communication signal through a communication module (e.g., the communication module 190 of FIG. 1), and may acquire location information of the electronic device 101 based on the at least one communication signal transmitted/received. For example, the processor 120 may acquire at least one piece of location information on the electronic device, by using at least one of a signal received through a GPS receiver, a signal received from at least one AP, a beacon signal received from at least one different electronic device, a signal received from at least one IoT device, and a signal received from at least one sensor device. The location information acquired based on different types of communication signals may be the same or different from each other. According to an embodiment, the processor 120 may determine the visiting area of the electronic device 101 based on a margin of error of the acquired location information. For example, the processor 120 may determine an area corresponding to the margin of error as the visiting area based on the acquired location information.

According to various embodiments, in operation 203, the electronic device (e.g., the processor 120) may acquire information on a plurality of places corresponding to a visiting area. According to an embodiment, the processor 120 may acquire information on the plurality of places corresponding to the visiting area, based on communication with a server (e.g., the server 108 of FIG. 1) and/or a pre-acquired place-related database. For example, the processor 120 may transmit to the server 108 a signal for requesting place information on the visiting area, and may receive from the server 108 a response signal including information on the plurality of places corresponding to the visiting area. The signal for requesting the place information on the visiting area may include information indicating the visiting area. The information on the plurality of places may include at least one of a name of a place, location information of the place (e.g., a location coordinate indicating latitude and longitude), an address of the place, a category of the place, and an operating hour of the place. For instance, if there are a pizza store and a hospital in the visiting area, the information on the plurality of places may include "first place—name: OOOO pizza, location information: (latitude1, longitude1), address: 129-1, Samseong-ro, Yeongtong-gu, Suwon-si, Gyeonggi-do, category: food/pizza specialty store, operating hour: 10:00-21:00" and "second place—name: OO hospital, location information: (latitude2, longitude2), address: 129-2, Samseong-ro, Yeongtong-gu, Suwon-si, Gyeonggi-do, category: hospital, operating hour: 09:00-18:00". As another example, the processor 120 may acquire the information on the plurality of places corresponding to the visiting area from a place-related database pre-stored in a memory (e.g., the memory 130 of FIG. 1).

The place-related database may include information on places corresponding to respective various areas. According to an embodiment, the processor 120 may generate a candidate place list including information on the plurality of places corresponding to the visiting area.

According to various embodiments, in operation 205, the electronic device (e.g., the processor 120) may acquire place-related information, based on usage information and storage information of the electronic device. The usage information of the electronic device may include information related to an operation of the electronic device, which occurs during a specific time duration including a visit time. The specific time duration including the visit time may include, for example, from a timing earlier by a designated time duration than a visit time corresponding to a visiting area to timings at which the electronic device 101 stays in the visiting area. For instance, the specific time duration including the visit time may include a time duration from a timing earlier by a designated time duration than the visit time corresponding to the visiting area to a timing of detecting that the electronic device 10 deviates from the visiting area. According to an embodiment, the usage information of the electronic device may include at least one of information related to an application program, information related to a website, information related to a captured image, and information related to a user input. According to an embodiment, the storage information of the electronic device may include user profile information or schedule information pre-stored in the memory 130 of the electronic device 101. According to an embodiment, the processor 120 may collect the usage information and storage information of the electronic device, and may acquire place-related information from the collected information. The place-related information may include at least one of a place name and place category information.

According to various embodiments, in operation 207, the electronic device (e.g., the processor 120) may determine a visiting place, based on information on a plurality of places and place-related information. According to an embodiment, the processor 120 may determine whether information on a plurality of places corresponding to a visiting area matches the place-related information, and may determine the visiting place of the electronic device, based on a matching result. For example, the processor 120 may determine a place matching the place-related information among the plurality of places corresponding to the visiting area as the visiting place of the electronic device. As another example, the processor 120 may determine a priority of each of the plurality of places, based on the matching result of the plurality of places corresponding to the visiting area and the place-related information, and may determine a place having a higher priority as the visiting place of the electronic device.

Figure 3:
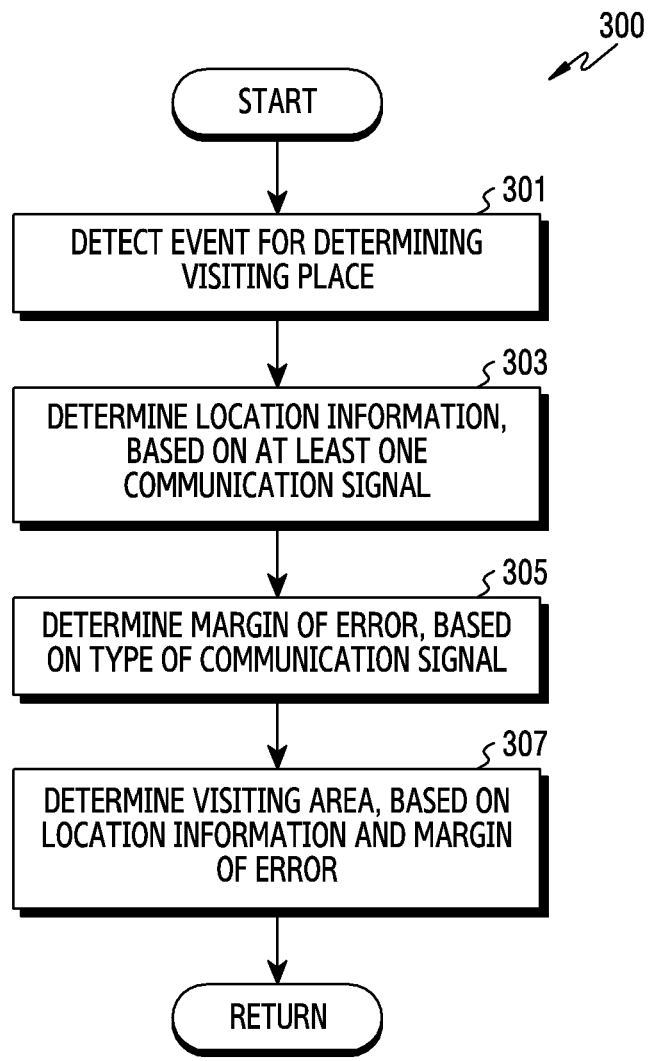
FIG. 3 is a flowchart for determining a visiting area in an electronic device according to various embodiments of the disclosure.

FIG. 3 is a flowchart 300 for determining a visiting area in an electronic device according to various embodiments of the disclosure. Operations of FIG. 3 described hereinafter may be at least part of details of the operation 201 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 3, in operation 301, an electronic device (e.g., the processor 120 of FIG. 1) according to various embodiments may detect an event for determining a visiting place of the electronic device. According to an embodiment, when a designated period arrives, the processor 120 may determine that the event for determining the visiting place of the electronic device has occurred. According to an embodiment, if a designated condition is satisfied (e.g., when a movement and/or motion of the electronic device is not detected for a specific time duration), the processor 120 may determine that the event for determining the visiting place of the electronic device has occurred. For example, the processor 120 may acquire sensor data indicating the movement and/or motion of the electronic device through a sensor module (e.g., the sensor module 176 of FIG. 1), and based on the acquired sensor data, may determine whether a time duration in which the movement and/or motion of the electronic device is not detected is continued more than a specific time. If the time duration in which the movement and/or motion of the electronic device is not detected is continued more than the specific time, the processor 120 may determine that the electronic device visits a specific place having a physical meaning, and may determine that the event for determining the visiting place of the electronic device has occurred. According to an embodiment, the processor 120 may detect at least one of a user input, a request of at least one application program, and a designated event, and based thereon, may determine that the event for determining the visiting place of the electronic device has occurred.

According to various embodiments, in operation 303, the electronic device (e.g., the processor 120) may determine location information, based on at least one communication signal. According to an embodiment, upon detecting an event for determining the visiting place, the processor 120 may transmit and/or receive at least one communication signal through the communication module 190, and may determine (or acquire) the location information of the electronic device 101, based on the transmitted and/or received at least one communication signal. The at least one communication signal may include, for example, at least one of a GPS reception signal, a signal received from a cell tower (or a base station), a signal received from an Access Point (AP) of a short-range wireless communication network (e.g., WiFi), a beacon signal, a signal transmitted and/or received with respect to Internet of Things (IoT) devices, and a signal transmitted and/or received with respect to another electronic device. According to an embodiment, the processor 120 may acquire at least one piece of location information by using at least one of location information included in at least one communication signal (e.g., location information of a device which has transmitted a communication signal), time information included in the at least one communication signal, reception strength of the at least one communication signal, and sensor data included in the at least one communication signal. For example, the processor 120 may acquire first location information from the GPS reception signal, and may acquire second location information, based on the signal transmitted and/or received with respect to IoT devices. The first location information and the second location information may be the same or different from each other.

According to various embodiments, in operation 305, the electronic device (e.g., the processor 120) may determine a margin of error, based on a type of the communication signal. According to an embodiment, the processor 120 may determine the margin of error, based on the type of the communication signal used to determine location information. For example, if first location information is determined based on the GPS reception signal, the processor 120 may determine a first margin of error (e.g., a first radius) corresponding to the GPS reception signal as a margin of error of the first location information. As another example, if second location information is determined based on the signal transmitted and/or received with respect to the IoT devices, the processor 120 may determine a second margin of error (e.g., a second radius) corresponding to the communication signal of the IoT device as a margin of error of the second location information. According to an embodiment, a margin of error corresponding to each type of the communication signal may be pre-designated by an operator and/or a designer, or may be acquired from a corresponding communication signal. According to an embodiment, a margin of error corresponding to each type of the communication signal may be acquired from a server (e.g., the server 108 of FIG. 1).

According to various embodiments, in operation 307, the electronic device (e.g., the processor 120) may determine the visiting area, based on the location information and the margin of error. According to an embodiment, the processor 120 may determine an area corresponding to the margin of error as the visiting area, based on the acquired location information. According to an embodiment, upon acquiring a plurality of pieces of location information, the processor 120 may determine a plurality of candidate visiting areas by using each piece of location information and a margin of error of each piece of location information, and may determine an area commonly included in the plurality of candidate visiting areas as the visiting area of the electronic device. For example, the processor 120 may determine a first candidate visiting area, based on the first location information and the first margin of error (e.g., the first radius) of the first location information, and may determine a second candidate visiting area, based on the second location information and the second margin of error (e.g., the second radius) of the second location information. The processor 120 may determine a common area included in both the first candidate visiting area and the second candidate visiting area as the visiting area of the electronic device.

Figure 4:
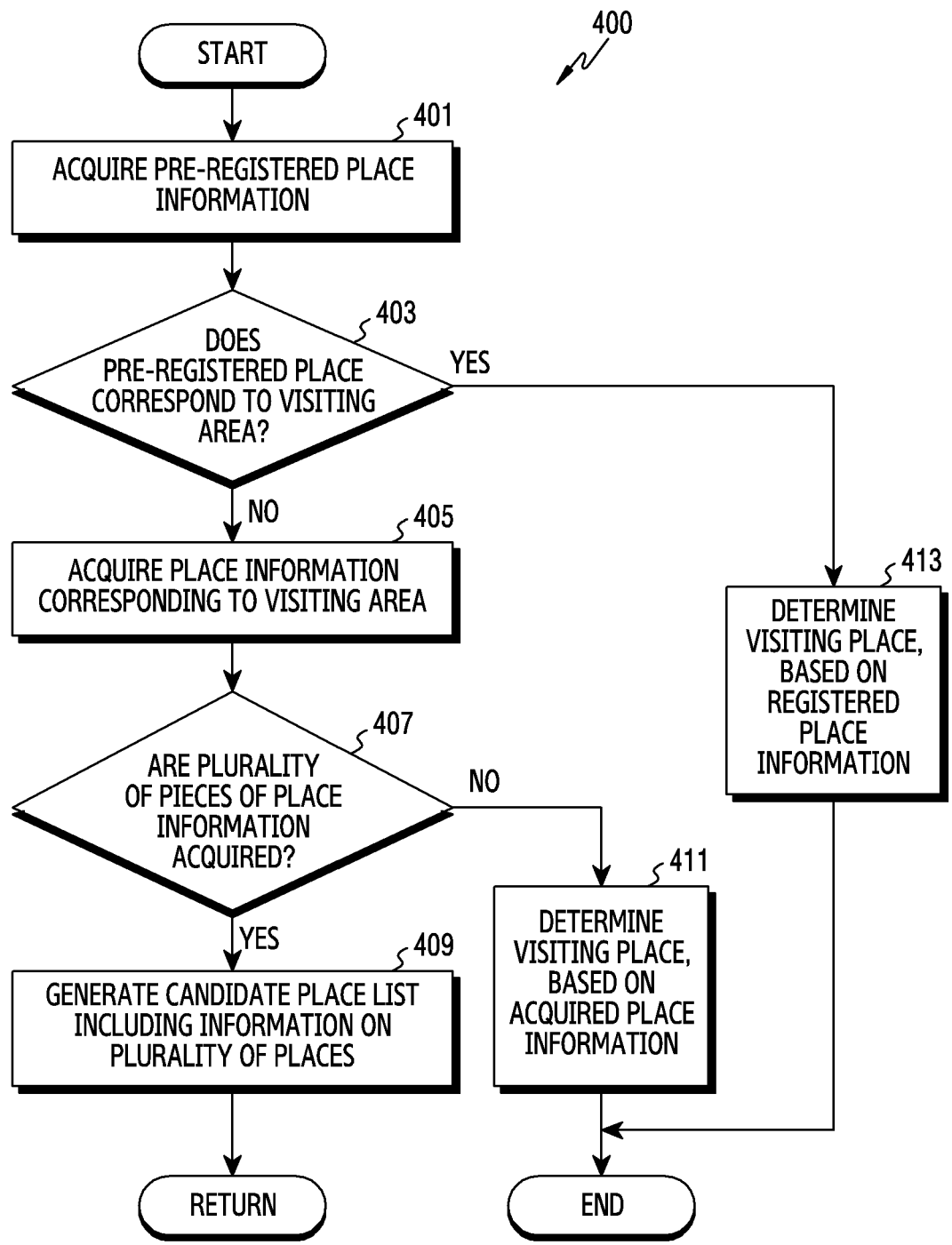
FIG. 4 is a flowchart for acquiring information of places corresponding to a visiting area in an electronic device according to various embodiments of the disclosure.

FIG. 4 is a flowchart 400 for acquiring information of places corresponding to a visiting area in an electronic device according to various embodiments of the disclosure. Operations of FIG. 4 described hereinafter may be at least part of details of the operation 203 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 4, in operation 401, an electronic device (e.g., the processor 120 of FIG. 1) according to various embodiments may acquire pre-registered place information. According to an embodiment, the processor 120 may acquire information on a place pre-registered (or designated) in the electronic device as a favorite place or a place scheduled to visit. For example, the processor 120 may acquire information of the pre-registered place as a favorite location through a navigation application program. As another example, the processor 120 may acquire information of a place pre-registered as the place scheduled to visit through a memo application program or a schedule application program. The information of the pre-registered place may include at least one of a name of the place, a location information of the place, and a category of the place. For example, the information on the pre-registered place may include "name of the place: swimming pool, location information of the place: 129-3, Samseong-ro, Yeongtong-gu, Suwon-si, Gyeonggi-do, category: exercise place".

According to various embodiments, in operation 403, the electronic device (e.g., the processor 120) may determine whether the pre-registered place corresponds to the visiting area. According to an embodiment, the processor 120 may determine whether the pre-registered place is a place included in the visiting area, based on location information of the pre-registered place.

According to various embodiments, if the pre-registered place corresponds to the visiting area, in operation 413, the electronic device (e.g., the processor 120) may determine the visiting place, based on the pre-registered place information. According to an embodiment, if the pre-registered place is a place included in the visiting area, the processor 120 may determine the pre-registered place included in the visiting area as the visiting place. For example, if location information of a swimming pool which is a pre-registered place is a place included in the visiting area of the electronic device, the processor 120 may determine the visiting place of the electronic device as the swimming pool.

According to various embodiments, if the pre-registered place does not correspond to the visiting area, in operation 405, the electronic device (e.g., the processor 120) may acquire information of a place corresponding to the visiting area from a server (e.g., the server 108 of FIG. 1) and/or a database of a memory (e.g., the memory 130 of FIG. 1). According to an embodiment, information of the place corresponding to the visiting area may be acquired as described in the operation 203 of FIG. 2. According to an embodiment, the processor 120 may acquire information on at least one place corresponding to the visiting area, based on communication with the server 108 and/or a place-related database pre-stored in the memory 130.

According to various embodiments, in operation 407, the electronic device (e.g., the processor 120) may determine whether information on a plurality of places is acquired. According to an embodiment, the processor 120 may determine whether information on one place is included in information of a place corresponding to the visiting area, or whether information on a plurality of places is included. For example, based on the place information acquired in operation 405, the processor 120 may determine whether only one place exists or whether a plurality of places exist in the visiting area.

According to various embodiments, if the information on the plurality of places is not acquired and information on only one place is acquired, in operation 411, the electronic device (e.g., the processor 120) may determine the visiting area, based on the acquired information on one place. According to an embodiment, when only information on one place is included in the information of the place corresponding to the visiting area, the processor 120 may determine that only one place exist in the visiting area, and may determine one place as the visiting place.

According to various embodiments, upon acquiring the information on the plurality of places, in operation 409, the electronic device (e.g., the processor 120) may generate a candidate place list including the information on the plurality of places. According to an embodiment, when the information on the plurality of places is included in the information of the place corresponding to the visiting area, the processor 120 may determine that a plurality of places exist in the visiting area, and may generate a candidate place list including the information on the plurality of places. According to an embodiment, based on a visit time corresponding to the visiting area, the processor 120 may select at least one place among the plurality of places corresponding to the visiting area, and may generate a candidate place list including only information of the selected place. The visit time may include a time for which the electronic device 101 stays in the visiting area or a time for which the electronic device 101 moves from another area to the visiting area. For example, the processor 120 may select at least one place determined to be in an operating state at the visit time, based on the operating hour and visit time of the plurality of places corresponding to the visiting area, and may generate a candidate place list including information on the selected at least one place. As another example, the processor 120 may generate a candidate place list including information on the remaining places other than a place determined to be not in the operating state at the visit time, based on the operating hour and visit time of the plurality of places corresponding to the visiting area. According to an embodiment, the processor 120 may determine a priority for each of the plurality of places corresponding to the visiting area. For example, the processor 120 may determine the priority for each of the plurality of places, based on received signal strength in the visiting area. For instance, the processor 120 may assign a highest priority to a location where signal strength is measured to be the highest, and may assign a lowest priority to a location where the signal strength is measured to be the lowest.

Figure 5:
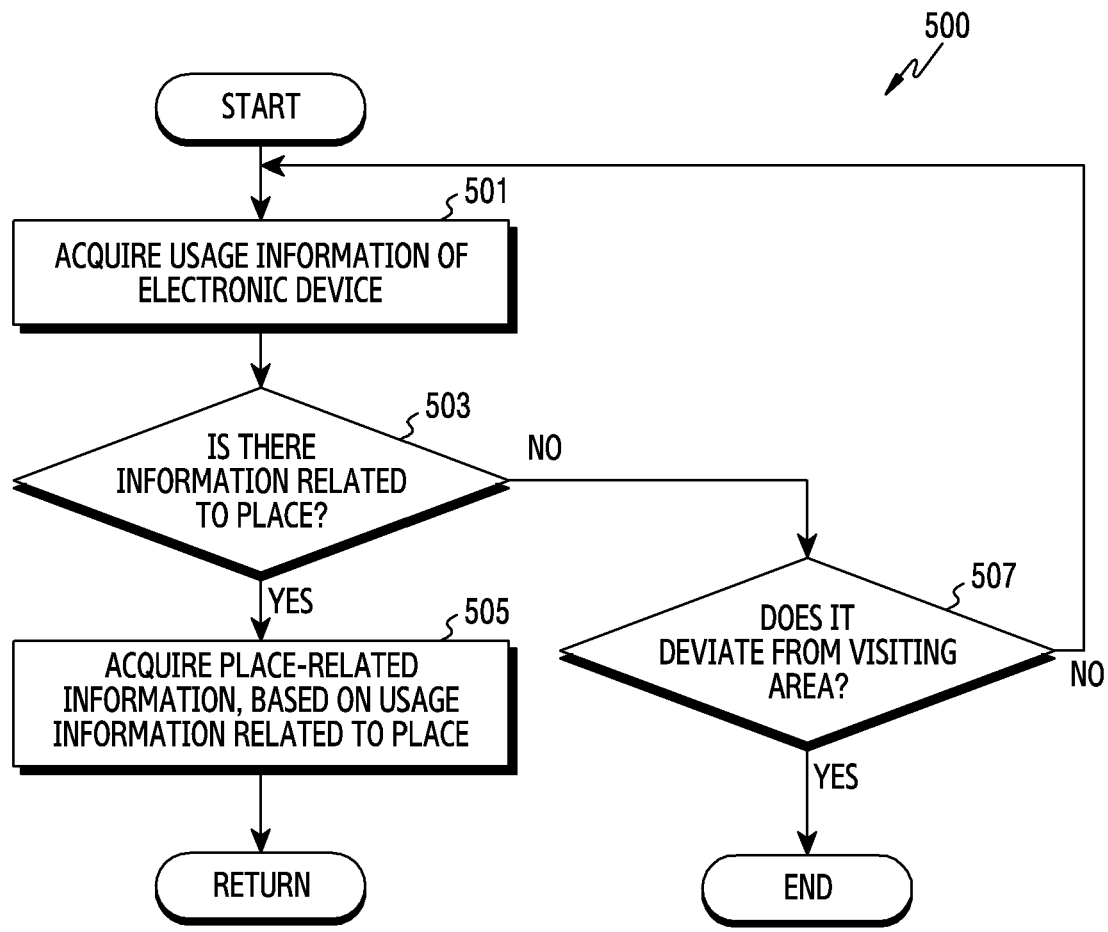
FIG. 5 is a flowchart for acquiring place-related information, based on usage information of an electronic device, in the electronic device according to various embodiments of the disclosure.

FIG. 5 is a flowchart 500 for acquiring place-related information, based on usage information of an electronic device, in the electronic device according to various embodiments of the disclosure. Operations of FIG. 5 described hereinafter may be at least part of details of the operation 205 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 5, in operation 501, an electronic device (e.g., the processor 120 of FIG. 1) according to various embodiments may acquire (or collect) usage information of the electronic device. According to an embodiment, the processor 120 may acquire the usage information of the electronic device as described in the operation 205 of FIG. 2. For example, the processor 120 may acquire the usage information of the electronic device, including at least one of information related to an application program, information related to a website, information related to a captured image, and information related to a user input during a specific time duration including a visit time. According to an embodiment, the processor 120 may identify whether an application is executed in the electronic device during the specific time duration including the visit time. When the application is executed, the processor 120 may acquire at least one of a name, category, execution time, and execution frequency of each of application programs executed (or used). According to an embodiment, the processor 120 may identify whether a website access event occurs during the specific time duration including the visit time. When the website access event occurs, the processor 120 may acquire at least one of a name, category, address information, access time information, access frequency information, and website-based search information of the accessed website. According to an embodiment, the processor 120 may identify whether an image is acquired (or received) from a camera module (e.g., the camera module 180 of FIG. 1) or another electronic device (e.g., the electronic device 102 or electronic device 104 of FIG. 1) during the specific time duration including the visit time. Upon acquiring the image, the processor 120 may analyze the acquired image and/or metadata of the image to acquire at least one of capture time information of the image, information of a subject in the image, and text information in the image. According to an embodiment, the processor 120 may detect whether a user input occurs during a specific time duration including the visit time. Upon detecting the user input, the processor 120 may acquire text information or voice information from the user input.

According to various embodiments, in operation 503, the electronic device (e.g., the processor 120) may determine whether place-related information exists in the acquired user information of the electronic device. According to an embodiment, the processor 120 may determine whether the acquired usage information of the electronic device is the place-related information. The processor 120 may determine whether the usage information of the electronic device is the place-related information, based on whether the acquired usage information of the electronic device has a word related to a place, a subject related to the place, a text related to the place, or voice information related to the place. According to an embodiment, at least one of the word related to the place, the subject related to the place, the text related to the place, and the voice information related to the place may be updated by learning. For example, if the usage information of the electronic device is "name of application program: OO cafe, category: coffee shop application, usage time: 2018.04.12, 13:05-13:10", since the place-related words "OO cafe" and "OO coffee shop" are included, the processor 120 may determine corresponding information as information related to the place. As another example, if the usage information of the electronic device is "website name: OO restaurant, category: restaurant/Italian restaurant, access time: 2018.04.12, 12:40-13:00, search information through the website: pasta", since the place-related words "OO restaurant", "restaurant/Italian restaurant", and "pasta" are included, the processor 120 may determine corresponding information as information related to the place. As another example, if the usage information of the electronic device is "image capture time: 2018.04.12, 13:30, subject in image: menu, text information in image: OOO restaurant, pizza, pasta", since the place-related words "OOO restaurant", "pizza", and "pasta" are included, the processor 120 may determine corresponding information as information related to the place. As another example, if the usage information of the electronic device is "text information: I will call you in 5 minutes", since the place-related word is not included, the processor 120 may determine corresponding information as information not related to the place.

According to various embodiments, if the place-related information exists in the acquired usage information of the electronic device, in operation 505, the electronic device (e.g., the processor 120) may acquire the place-related information, based on the usage information related to the place. According to an embodiment, the processor 120 may acquire the place-related information, based on information determined to be related to the place in the usage information of the electronic device. The place-related information may include at least one of a place name and a place category. The place category may include a word related to the place. According to an embodiment, the processor 120 may generate place-related information from the information determined to be related to the place in the acquired usage information of the electronic device. For instance, if the usage information of the electronic device is "name of application program: OO cafe, category: coffee shop application, usage time: 2018.04.12, 13:05-13:10", the processor 120 may acquire "place name: OO cafe, place category: coffee shop" as the place-related information. As another example, if the acquired usage information of the electronic device is "website name: OO restaurant, category: restaurant/Italian restaurant, access time: 2018.04.12, 12:40-13:00, search information through the website: pasta", the processor 120 may acquire "place name: OOO pizza, place category: pizza" as the place-related information.

According to various embodiments, if the place-related information does not exist in the acquired usage information of the electronic device, in operation 507, the electronic device (e.g., the processor 120) may determine whether the electronic device deviates from the visiting area. According to an embodiment, based on sensor data acquired through a sensor module (e.g., the sensor module 176 of FIG. 1), the processor 120 may determine whether it is a state where the electronic device deviates from the visiting area and moves to another area or whether the electronic devices continuously stays in the visiting area. According to an embodiment, the processor 120 may acquire location information of the electronic device, based on at least one communication signal acquired through a communication module (e.g., the communication module 190 of FIG. 1), and may determine whether it is a state where the electronic device deviates from the visiting area and moves to another area, or whether the electronic device continuously stays in the visiting area.

According to various embodiments, if the electronic device does not deviate from the visiting area but continuously stays in the visiting area, returning to operation 501, the electronic device (e.g., the processor 120) may repeat the subsequent operations. For example, the processor 120 may continuously acquire the usage information of the electronic device during the electronic device continuously stays in the visiting area, and may acquire place-related information from the acquired usage information of the electronic device.

Figure 6:
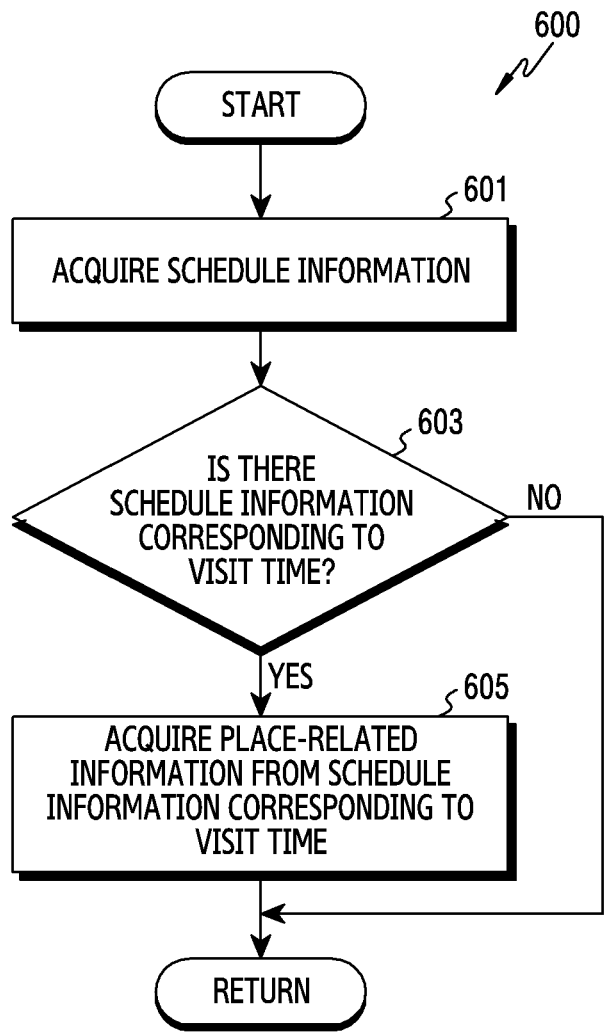
FIG. 6 is a flowchart for acquiring place-related information, based on schedule information, in an electronic device according to various embodiments of the disclosure.

FIG. 6 is a flowchart 600 for acquiring place-related information, based on schedule information, in an electronic device according to various embodiments of the disclosure. Operations of FIG. 6 described hereinafter may be at least part of details of the operation 205 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 6, in operation 601, an electronic device (e.g., the processor 120 of FIG. 1) according to various embodiments may acquire schedule information. According to an embodiment, as described in the operation 205 of FIG. 2, the processor 120 may acquire the schedule information from a memory (e.g., the memory 130 of FIG. 1) of the electronic device. For example, the processor 120 may acquire schedule information including time information and/or place information related to a user schedule from the memory 130. For instance, the schedule information may include time information and/or place information related to a user schedule such as "2018.04.12, dinner with son", "2018.04.12, OO pizza with son", "2018.04.12, 13:00, dental appointment", "2018.04.12, 13:00, OO dentist", or the like. According to an embodiment, the processor 120 may acquire the schedule information from at least one application program among an e-mail application program, a calendar application program, a message application program, a memo application program, and a note application program.

According to various embodiments, in operation 603, the electronic device (e.g., the processor 120) may determine whether schedule information corresponding to a visit time exists in the acquired schedule information. According to an embodiment, the processor 120 may determine whether the schedule information corresponding to the visit time exists, based on time information of the schedule information acquired from the memory 130. For example, the processor 120 may determine whether corresponding schedule information is the schedule information corresponding to the visit time, based on at least one of date, start time, and/or end time of the schedule information. For instance, if the visit time information is "2018.04.12, 18:00 current time (e.g., 18:30)" and the acquired schedule information is "first schedule information: 2018.04.12, OO pizza with son", "second schedule information: 2018.04.12, 13:00, OO dental appointment", and "third schedule information: 2018.04.13, 17:00, OOO restaurant reservation", the processor 120 may determine the first schedule information, which has the same date information and for which specific time information is not set, as the schedule information corresponding to the visit time. As another example, if the visit time information is "2018.04.12, 12:45~current time (e.g., 13:20)" and the acquired schedule information is "first schedule information: 2018.04.12, OO pizza with son", "second schedule information: 2018.04.12, 13:00, OO dental appointment", and "third schedule information: 2018.04.13, 17:00, OOO restaurant reservation", the processor 120 may determine the second schedule information, which has the same date information and has a start time included in the visit time, as the schedule information corresponding to the visit time.

According to various embodiments, in operation 605, the electronic device (e.g., the processor 120) may acquire the place-related information from the schedule information corresponding to the visit time. According to an embodiment, the processor 120 may acquire the place-related information from the schedule information corresponding to the visit time. For example, if the schedule information corresponding to the visit time is "first schedule information: 2018.04.12, OO pizza with son", the processor 120 may acquire place-related information "pizza" from the first schedule information, and may generate place-related information including "lace category: pizza". As another example, if the schedule information corresponding to the visit time is "second schedule information: 2018.04.12, 2018.04.12, 13:00, OO dental appointment", the processor 120 may acquire place-related information "OO dentist" from the second schedule information, and may generate place-related information including "place name: OO dentist, place category: dentist".

Figure 7:
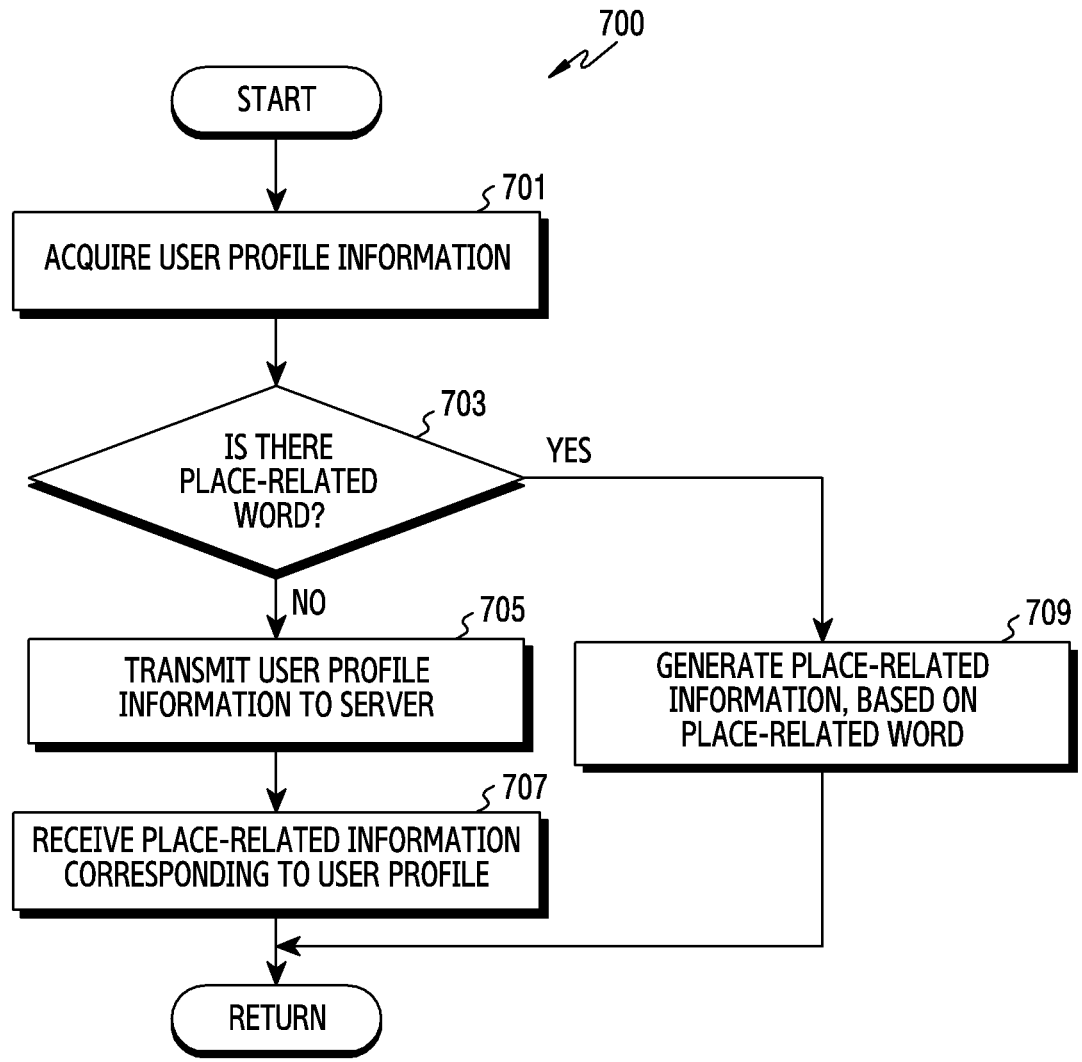
FIG. 7 is a flowchart for acquiring place-related information, based on a user profile, in an electronic device according to various embodiments of the disclosure.

FIG. 7 is a flowchart 700 for acquiring place-related information, based on a user profile, in an electronic device according to various embodiments of the disclosure. Operations of FIG. 7 described hereinafter may be at least part of details of the operation 205 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 7, in operation 701, an electronic device (e.g., the processor 120 of FIG. 1) according to various embodiments may acquire user profile information. The user profile information may include, for example, at least one of a user characteristic and preference information. For instance, the user profile information may include anthropological category information such as age, gender, family information, and address, and may include information such as favorite sports, favorite food, favorite music, favorite movies, frequently visiting places, and the like.

According to various embodiments, in operation 703, the electronic device (e.g., the processor 120) may determine whether the user profile information has a place-related word. For example, the processor 120 may determine whether the user profile information has a word corresponding to the place name or place category information. For instance, if the user profile information is "age: 20s, favorite sports: bowling", since the place-related word "bowling" is included, the processor 120 may determine that the user profile information has the place-related word. As another example, if the user profile information is "age: 30, gender: male, family information: 3-year-old child", the processor 120 may determine that there is no place-related word.

According to various embodiments, if the user profile information has the place-related word, in operation 709, the electronic device (e.g., the processor 120) may generate place-related information, based on the place-related word included in the user profile information. For example, if the user profile information is "age: 20s, favorite sports: bowling", the processor 120 may generate place-related information including "place category: bowling", based on the place-related word "bowling".

According to various embodiments, if the user profile information does not have the place-related word, in operation 705, the electronic device (e.g., the processor 120) may transmit the user profile information to a server (e.g., the server 108 of FIG. 1). According to an embodiment, the processor 120 may transmit to the server 108 a signal for requesting to transmit place-related information corresponding to the user profile information.

According to various embodiments, in operation 707, the electronic device (e.g., the processor 120) may receive the place-related information corresponding to the user profile from the server 108. The place-related information received from the server 108 may include information related to a place preferred by a plurality of different users having profile information similar to the user profile information. For example, if the user profile information is "age: 30, gender: male, family information: 3-year-old child", the place-related information received from the server 108 may include information related to a place preferred by men in their 30s with children. As another example, if the user profile information is "age: 30, gender: male, family information: 3-year-old child", the place-related information received from the server 108 may include information related to a place not preferred by men in their 30s with children.

Figure 8:
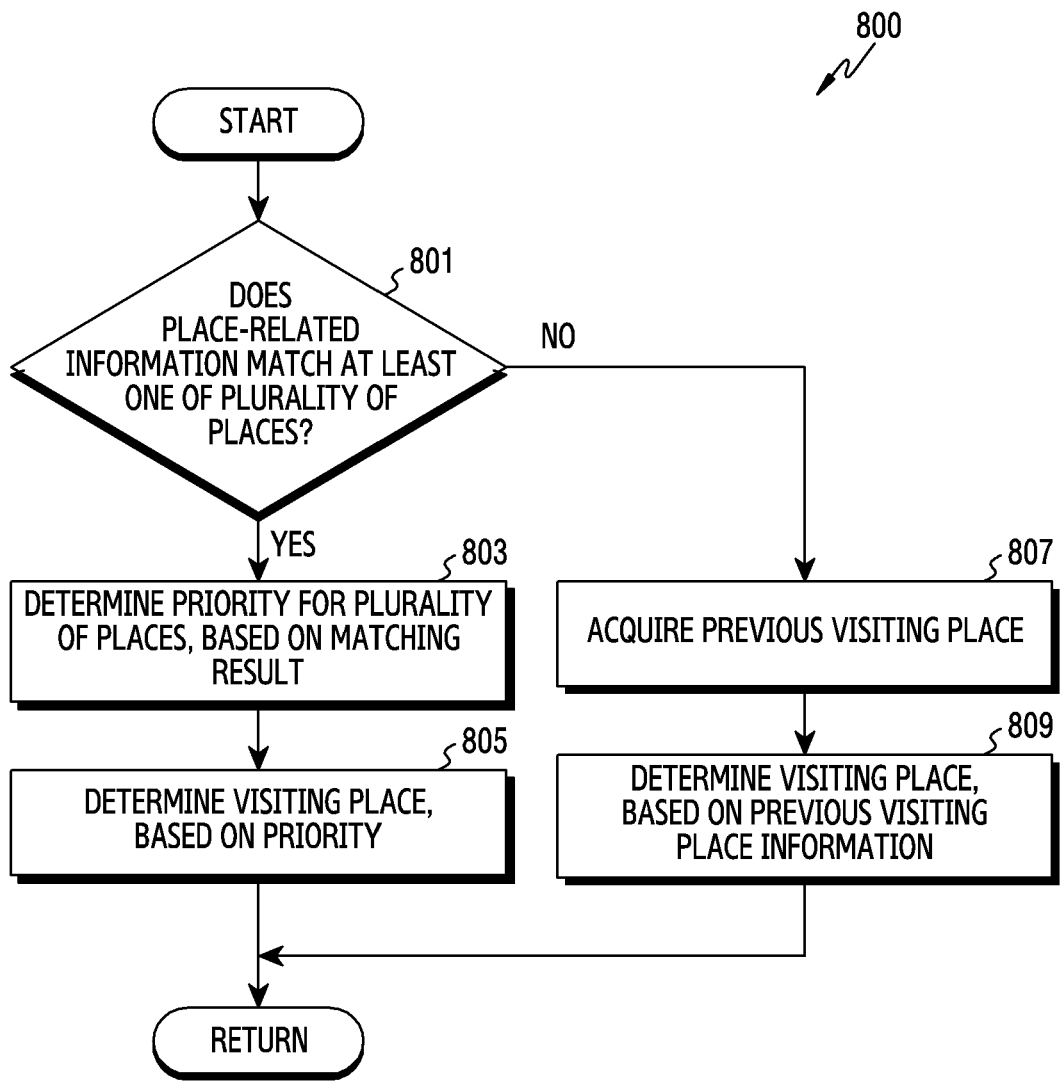
FIG. 8 is a flowchart for determining a visiting place, based on a priority, in an electronic device according to various embodiments of the disclosure.

FIG. 8 is a flowchart 800 for determining a visiting place, based on a priority, in an electronic device according to various embodiments of the disclosure. Operations of FIG. 8 described hereinafter may be at least part of details of the operation 207 of FIG. 2. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1.

Referring to FIG. 8, in operation 801, an electronic device (e.g., the processor 120 of FIG. 1) according to various embodiments may determine whether place-related information matches at least one of a plurality of places. The plurality of places may be places corresponding to a visiting area or places included in a candidate place list. According to an embodiment, if the place-related information has a place name, the processor 120 may determine whether there is a place having the same place name as a corresponding place name among the plurality of places. If there is a place having the same place name as a place name of a first place among the plurality of places, the processor 120 may determine that the place-related information matches the first place. According to an embodiment, if the place-related information has a place category, the processor 120 may determine whether there is a place having the same category as a corresponding place category among the plurality of places. If a place category of a second place is the same as a category of a corresponding place among the plurality of places, the processor 120 may determine that the place-related information matches the second place.

According to various embodiments, if the place-related information matches at least one of the plurality of places, in operation 803, the electronic device (e.g., the processor 120) may determine a priority for the plurality of places, based on a matching result. According to an embodiment, the processor 120 may determine a priority of a place matching the place-related information among the plurality of places to be higher than a priority of a place not matching the place-related information. According to an embodiment, the processor 120 may determine a priority of a place having a relatively large number of pieces of matching place-related information among the plurality of places to be higher than a priority of a place having a relatively small number of pieces of matching place-related information. According to an embodiment, the processor 120 may determine a priority of a place matching a place name among the plurality of places to be higher than a priority of a place matching a place category. The aforementioned priority determining method is for exemplary purposes, and the disclosure is not limited thereto. For example, the processor 120 may determine the priority of the plurality of places in various manners.

According to various embodiments, in operation 805, the electronic device (e.g., the processor 120) may determine a visiting place, based on the priority. According to an embodiment, the processor 120 may determine a place having a highest priority as the visiting place among the plurality of places. According to an embodiment, if at least two places have the same priority among the plurality of places, the processor 120 may determine the visiting place, based on a user input. For example, if at least two places have the same priority among the plurality of places, the processor 120 may display on a display device (e.g., the display device 160 of FIG. 1) a user interface for requesting to select a visiting place in the at least two places, and may determine the visiting place, based on user selection. According to an embodiment, the processor 120 may store visit time information and information of a place determined as the visiting place. For example, the processor 120 may store at least one of a visit time, a name of the visiting place, a category of the visiting place, location information of the visiting place, address information of the visiting place, and an operating hour of the visiting place.

According to various embodiments, if the place-related information does not match at least one of the plurality of places, in operation 807, the electronic device (e.g., the processor 120) may acquire information of a previous visiting place. According to an embodiment, the processor 120 may acquire information on places previously visited by the electronic device from a memory (e.g., the memory 130 of FIG. 1).

According to various embodiments, in operation 809, the electronic device (e.g., the processor 120) may determine the visiting place, based on the previous visiting place. According to an embodiment, the processor 120 may determine a place which matches information of the previous visiting place as the visiting place among the plurality of places.

Figure 9:
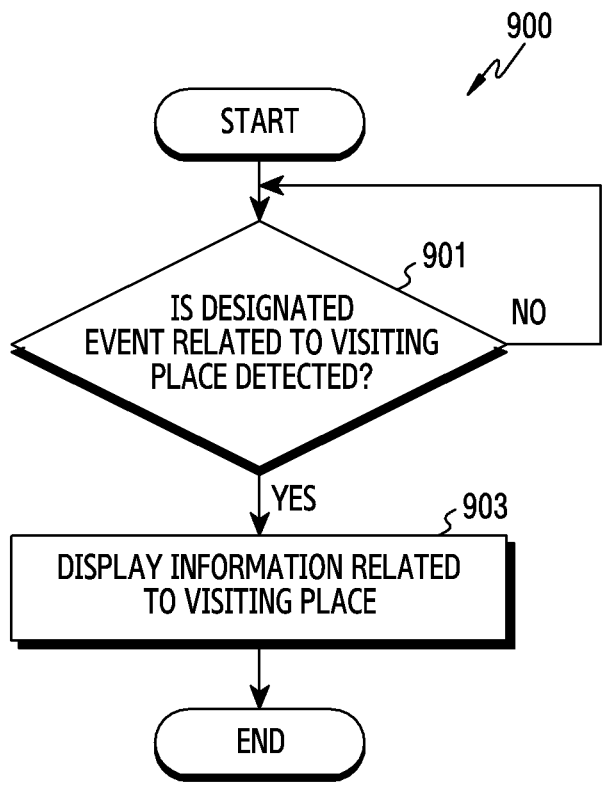
FIG. 9 is a flowchart for displaying visiting place information in an electronic device according to various embodiments of the disclosure.

FIG. 9 is a flowchart 900 for displaying visiting place information in an electronic device according to various embodiments of the disclosure. According to an embodiment, operations of FIG. 9 described hereinafter may be operations performed after the operations of FIG. 2 are performed at least once. According to an embodiment, operations of FIG. 9 described hereinafter may be at least part of details of the operation 805 of FIG. 8. In the following embodiment, each of operations may be performed sequentially, but is not necessarily performed sequentially. For example, an order of each of operations may be changed, and at least two operations may be performed in parallel. Herein, the electronic device may be the electronic device 101 of FIG. 1. Hereinafter, some operations of FIG. 9 will be described with reference to FIG. 10A to FIG. 10E. FIG. 10A to FIG. 10E illustrate a screen configuration for displaying visiting place information in an electronic device according to various embodiments of the disclosure.

Referring to FIG. 9, in operation 901, an electronic device (e.g., the processor 120 of FIG. 1) according to various embodiments may determine whether a designated event related to a visiting place is detected. According to an embodiment, upon detecting a user input for requesting the display of the visiting place, the processor 120 may determine that the designated event related to the visiting place is detected. According to an embodiment, upon detecting that the number of times of visiting the same place is greater than or equal to a designated count, the processor 120 may determine that the designated event related to the visiting place is detected. According to an embodiment, if the visiting place is a pre-designated place, the processor 120 may determine that the designated event related to the visiting place is detected. According to an embodiment, if a designated application is executed or execution of a designated function is requested, the processor 120 may determine that the designated event related to the visiting place is detected. According to an embodiment, if at least two places have the same priority among a plurality of places when the visiting place is determined, the processor 120 may determine that the designated event related to the visiting place is detected.

Figure 10A:
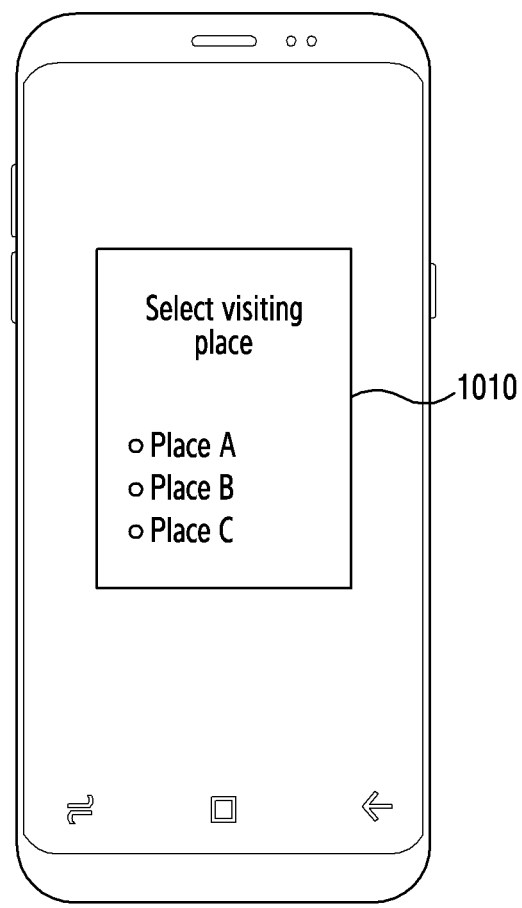
FIGS. 10A to 10E illustrate a screen configuration for displaying visiting place information in an electronic device according to various embodiments of the disclosure.
Figure 10B:
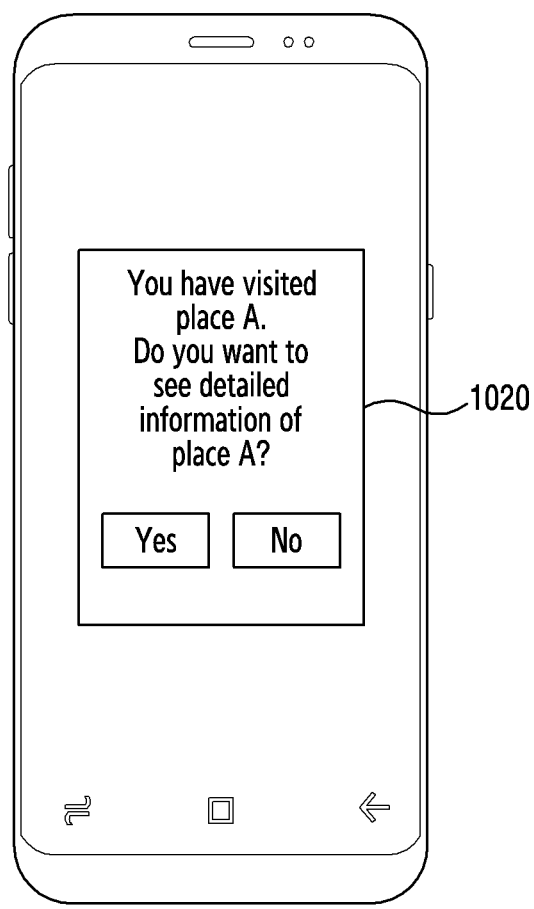
Figure 10C:
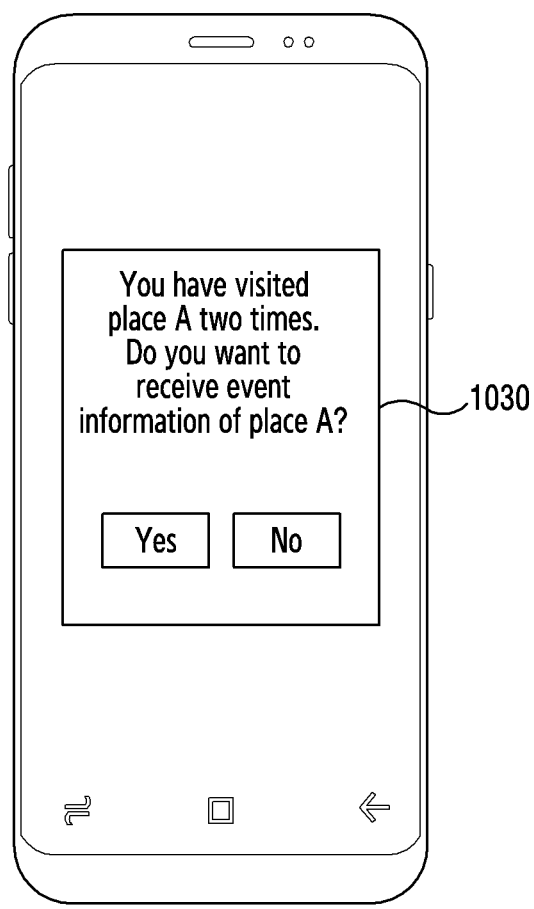
Figure 10D:
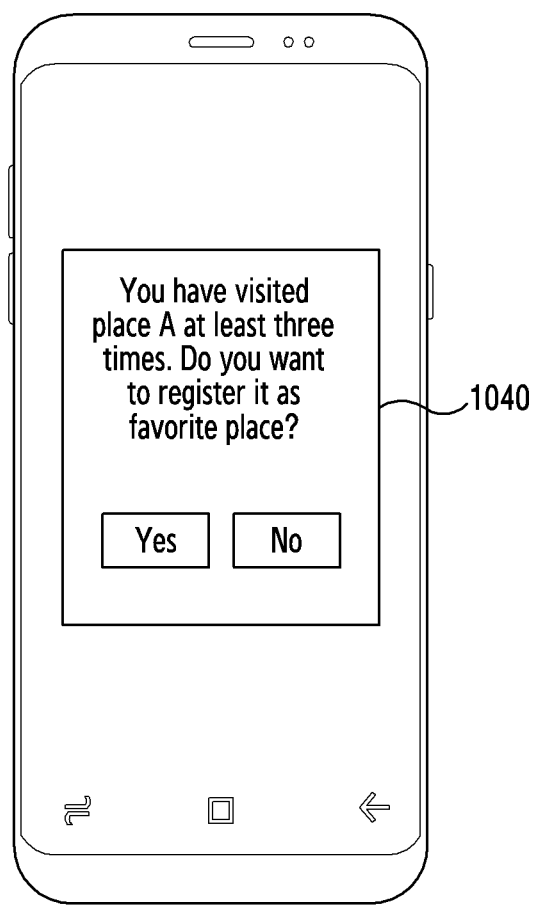
Figure 10E:
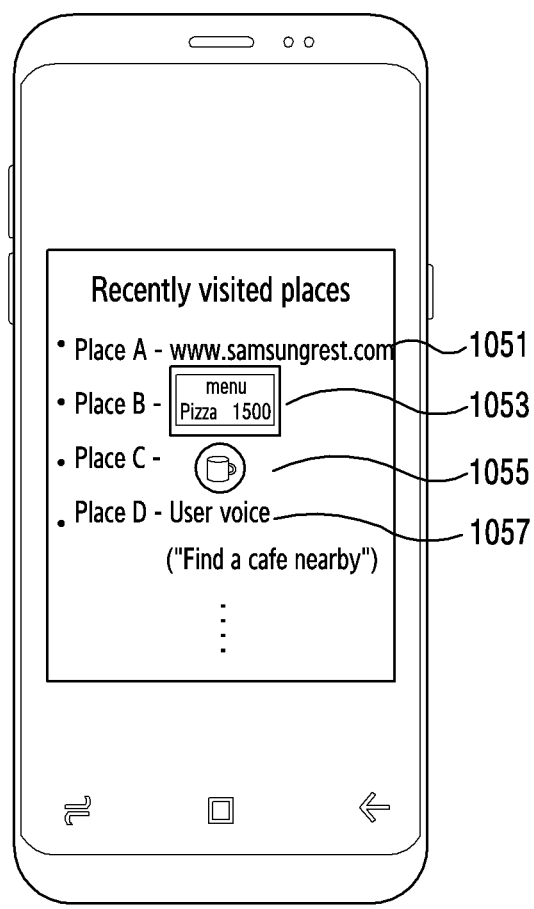

According to various embodiments, in operation 903, the electronic device (e.g., the processor 120) may display information related to the visiting place. According to an embodiment, the processor 120 may request to select the visiting place, by displaying information (e.g., a place name) on at least two places having the same priority among a plurality of places corresponding to the visiting area on a display device (e.g., the display device 160 of FIG. 1). For example, as shown in FIG. 10A, the processor 120 may display a user interface 1010 for requesting to select a visiting place among three places having the same priority, i.e., "place A, place B, place C". According to an embodiment, upon detecting an input for selecting any one of the three places having the same priority, the processor 120 may determine a selected place as the visiting place. According to an embodiment, the processor 120 may display a user interface for inquiring whether to display detailed information of the visiting place. For example, as shown in FIG. 10B, the processor 120 may display a message 1020 indicating that the visiting place is "place A" and inquiring whether to display detailed information on the place A. Based on a user input for requesting to display the detailed information, the processor 120 may acquire detailed information of the visiting place from a place-related database and/or a server (e.g., the server 108 of FIG. 1) and display the acquired detailed information. The detailed information may include at least one of an operating hour, discount information, advertisement content, event-related information, usage guide information, and contact information. The listed detailed information is for exemplary purposes only, and the disclosure is not limited thereto. According to an embodiment, the processor 120 may display a user interface for inquiring whether to receive event information for a corresponding visiting place while displaying information on the visiting place more than a designated number of times during a specific time duration. For example, as shown in FIG. 10C, the processor 120 may display a message 1030 for inquiring whether to receive the event information of the place A while informing that the number of times of visiting the "place A" is greater than or equal to 2. According to an embodiment, based on a user input for requesting to receive the event information, the processor 120 may acquire event information on the place A by periodically communicating with the server 108, and may provide the acquired event information to the user. According to an embodiment, the processor 120 may display a user interface for inquiring whether to register a corresponding visiting place as a favorite place, while displaying information on a place visited by at least a designated number of times during a specific time duration. For example, as shown in FIG. 10D, the processor 120 may display a message 1040 for inquiring whether to register the place A as the favorite place while informing that the number of times of visiting the "place A" is at least 3. According to an embodiment, based on a user input for requesting to register as the favorite place, the processor 120 may register the place A as the favorite place through a place-related application program (e.g., a navigation application program). According to an embodiment, the processor 120 may display a list indicating recent visiting places. The list indicating the visiting places may include information used to determine a corresponding place as the visiting place. For example, as shown in FIG. 10E, the processor 120 may display the "place A" together with a website address "www.samsungrest.com" (see 1051), display the "place B" together with a captured menu image (see 1053), display the "place C" together with an icon of an application program (see 1055), and display the "place D" together with a user voice ("find a cafe nearby") (see 1057), thereby indicating information used to determine each of places as the visiting place.

According to various embodiments, a method of operating an electronic device (e.g., the electronic device 101 of FIG. 1) may include determining a visiting area of the electronic device based on at least one signal received through a communication circuit (e.g., the communication module 190 of FIG. 1), acquiring information on a plurality of places corresponding to the visiting area, acquiring place-related information based on at least one of usage information of the electronic device and information stored in the memory, and determining one place among the plurality of places as a visiting place of the electronic device based on the information on the plurality of places and the place-related information.

According to various embodiments, the determining of the visiting area of the electronic device may include acquiring at least one piece of location information on the electronic device, based on at least one signal received through the communication circuit, determining at least one margin of error for the at least one piece of location information, based on a type of the at least one signal, and determining the visiting area of the electronic device, based on the at least one piece of location information and the at least one margin of error.

According to various embodiments, information on the plurality of places may include at least one of a place name, location information, address information, category information, and an operating hour for each of the plurality of places. The place-related information may include at least one of the place name and place category information.

According to various embodiments, usage information of the electronic device may include at least one of information related to an application program, information related to a website, information related to an image, and information related to a user input. The information related to the application program may include a name, category, execution time, and execution frequency of an executed application program. The information related to the website may include at least one of an accessed website name, category, address information, access time information, access frequency information, and search information through the accessed website. The information related to the image may include at least one of a capture time of the image, a subject in the image, and text information in the image. The information related to the user input may include at least one of text input information and voice input information.

According to various embodiments, information stored in the memory may include at least one of schedule information and user profile information.

According to various embodiments, the determining of one place among the plurality of place as the visiting place of the electronic device may include determining a priority of each of the plurality of places, based on information on the plurality of places and the place-related information; and determining one of the plurality of places as a visiting place of the electronic device, based on the priority of the plurality of places.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit;
a memory; and
at least one processor,
wherein the memory stores instructions, when executed, causing the processor to:
determine a visiting area of the electronic device based on at least one signal received through the communication circuit;
acquire information on a plurality of places corresponding to the visiting area;
acquire place-related information based on at least one of usage information of the electronic device and information stored in the memory;
determine whether the information on the plurality of places corresponding to the visiting area matches the place-related information; and
based on matching the information on the plurality of places and the place-related information, determine one place among the plurality of places matching the place-related information as a visiting place of the electronic device.

2. The electronic device of claim 1, wherein the instructions, when executed, cause the processor to:
acquire at least one piece of location information on the electronic device, based on at least one signal received through the communication circuit;
determine at least one margin of error for the at least one piece of location information, based on a type of the at least one signal; and
determine the visiting area of the electronic device, based on the at least one piece of location information and the at least one margin of error.

3. The electronic device of claim 1, wherein the instructions, when executed, cause the processor to:
acquire information of a place pre-registered in the electronic device;
determine whether the pre-registered place corresponds to the visiting area, based on the information of the pre-registered place; and
if the pre-registered place corresponds to the visiting area, determine the pre-registered place as the visiting place of the electronic device.

4. The electronic device of claim 3, wherein the instructions, when executed, cause the processor to:
if the pre-registered place does not correspond to the visiting area, transmit information of the visiting area to a server through the communication circuit;
receive information of a place corresponding to the information of the visiting area from the server through the communication circuit;
if one place corresponds to the information of the visiting area, determine the place as the visiting place of the electronic device; and
if a plurality of places correspond to the information of the visiting area, determine one place among the plurality of places as the visiting place of the electronic device, based on information on the plurality of places and the place-related information.

5. The electronic device of claim 1, wherein information on the plurality of places comprises at least one of a place name, location information, address information, category information, and an operating hour for each of the plurality of places,
wherein the place-related information comprises at least one of the place name and place category information, and
wherein information stored in the memory comprises at least one of schedule information and user profile information.

6. The electronic device of claim 1, wherein usage information of the electronic device comprises at least one of information related to an application program, information related to a website, information related to an image, and information related to a user input,
wherein the information related to the application program comprises a name, category, execution time, and execution frequency of an executed application program,
wherein the information related to the website comprises at least one of an accessed website name, category, address information, access time information, access frequency information, and search information through the accessed website,
wherein the information related to the image comprises at least one of a capture time of the image, a subject in the image, and text information in the image, and
wherein the information related to the user input comprises at least one of text input information and voice input information.

7. The electronic device of claim 1, wherein the instructions, when executed, cause the processor to:
acquire usage information of the electronic device during a specific time duration comprising a time of visiting the visiting area; and
acquire the place-related information from the acquired usage information.

8. The electronic device of claim 1, wherein the instructions, when executed, cause the processor to:
identify scheduling information corresponding to a time of visiting the visiting area in the schedule information stored in the memory; and
acquire the place-related information comprising at least one of a place name and a place category from the identified scheduling information.

9. The electronic device of claim 1, wherein the instructions, when executed, cause the processor to:
acquire user profile information stored in the memory;
acquire a place-related word from the user profile information; and
acquire the place-related information comprising at least one of a place name and a place category, based on the acquired place-related word.

10. The electronic device of claim 1, wherein the instructions, when executed, cause the processor to:
acquire user profile information stored in the memory;
transmit the user profile information to a server through the communication circuit; and
receive the place-related information corresponding to the user profile information from the server through the communication circuit.

11. The electronic device of claim 1, wherein the instructions, when executed, cause the processor to:
determine a priority of each of the plurality of places, based on information on the plurality of places and the place-related information; and determine one of the plurality of places as a visiting place of the electronic device, based on the priority of the plurality of places.

12. The electronic device of claim 1, further comprising a display, wherein the instructions, when executed, cause the processor to, upon satisfying a designated condition for the visiting place, control the display to display information related to the visiting place.

13. A method of operating an electronic device, the method comprising:
    determining a visiting area of the electronic device based on at least one signal received through a communication circuit;
    acquiring information on a plurality of places corresponding to the visiting area;
    acquiring place-related information based on at least one of usage information of the electronic device and information stored in a memory;
    determining whether the information on the plurality of places corresponding to the visiting area matches the place-related information; and
    based on matching the information on the plurality of places and the place-related information, determining one place matching the place-related information among the plurality of places as a visiting place of the electronic device.

14. The method of claim 13, wherein the determining of the visiting area of the electronic device comprises:
    acquiring at least one piece of location information on the electronic device, based on at least one signal received through the communication circuit;
    determining at least one margin of error for the at least one piece of location information, based on a type of the at least one signal; and
    determining the visiting area of the electronic device, based on the at least one piece of location information and the at least one margin of error.

15. The method of claim 13, wherein information on the plurality of places comprises at least one of a place name, location information, address information, category information, and an operating hour for each of the plurality of places,
    wherein the place-related information comprises at least one of the place name and place category information, and
    wherein information stored in the memory comprises at least one of schedule information and user profile information.

* * * * *